United States Patent [19]
Wilson et al.

[11] 3,844,876
[45] *Oct. 29, 1974

[54] FOAMED POLYESTER RESIN LAMINATED PRODUCTS

[75] Inventors: Christopher L. Wilson, High Point, N.C.; Oscar Shuffman, Scarsdale, N.Y.

[73] Assignees: Oscar Shuffman, Scarsdale, N.Y.; Fred Shuffman, Tenafly, N.J.

[ * ] Notice: The portion of the term of this patent subsequent to Feb. 23, 1982, has been disclaimed.

[22] Filed: Feb. 23, 1965

[21] Appl. No.: 440,054

Related U.S. Application Data

[62] Division of Ser. No. 441,986, July 8, 1954, Pat. No. 3,170,832.

[52] U.S. Cl. ................ 161/119, 161/123, 161/146, 161/160, 161/190, 260/2.5 A, 260/75 TN, 264/45, 264/321
[51] Int. Cl. ........................ B32b 27/40, B32b 3/26
[58] Field of Search ........ 260/75 NK, 75 TN, 2.5 A; 161/119, 123, 190, 146, 160, 161; 264/45, 321

[56] References Cited
UNITED STATES PATENTS

| | | | |
|---|---|---|---|
| 2,384,387 | 9/1945 | Meyer | 264/321 |
| 2,434,527 | 1/1948 | Untiedt | 156/93 |
| 2,582,294 | 1/1952 | Stober | 161/123 |
| 2,602,783 | 7/1952 | Simon et al. | 260/2.5 A |
| 2,639,252 | 5/1953 | Simon et al. | 264/45 |
| 2,642,920 | 6/1953 | Simon et al. | 161/93 |
| 2,676,164 | 4/1954 | Charlton et al. | 260/75 |
| 3,012,283 | 12/1961 | Foster | 264/321 |
| 3,170,832 | 2/1965 | Wilson et al. | 161/119 |
| 3,328,505 | 6/1967 | Spencer | 264/321 |

FOREIGN PATENTS OR APPLICATIONS

| | | | |
|---|---|---|---|
| 944,285 | 6/1956 | Germany | 161/1 |
| 601,681 | 7/1960 | Canada | 264/321 |

*Primary Examiner*—Harold Ansher
*Attorney, Agent, or Firm*—Richard K. Parsell

[57] ABSTRACT

Foam comprised in a body of resilient polyurethane foam is compressed and is fused so as to remain in a permanently compressed state by subjecting the foam while compressed to heat until said fusion occurs, the foam thereafter being permitted to cool while in said permanently compressed state.

8 Claims, 7 Drawing Figures

PATENTED OCT 29 1974

3,844,876

INVENTORS
CHRISTOPHER L. WILSON AND
OSCAR SHUFFMAN
BY
Kirschstein, Kirschstein & Ottinger
ATTORNEY

FOAMED POLYESTER RESIN LAMINATED PRODUCTS

CROSS-REFERENCE TO RELATED APPLICATIONS

This application is a division of our application Ser. No. 441,984, filed July 8, 1954, now U.S. Pat. No. 3,170,832.

BACKGROUND OF THE INVENTION

Many different types of polyester resins, made by esterifying polycarboxylic acids with polyhydric alcohols, are known. These resins have been cast or extruded to form films, they have been molded into shaped products, used as coating and impregnating materials, etc. More recently, a method of converting certain of these resins into light weight, expanded or foamed materials has been disclosed and claimed in a copending U.S. Pat. application, Ser. No. 420,744, filed Apr. 2, 1954, by Christopher L. Wilson and Oscar Shuffman and issued as U.S. Pat. No. 2,961,418. In the referred-to patent application one method of making the foamed resin product is to take a polyester resin which is a reaction product of adipic acid and diethylene glycol, said resin having an acid number between about 0 and 20 and a hydroxyl number of between about 20 and 100, mix the resin with a mixture of toluene diisocyanate- 2, 4 and 2, 6, a small amount of water and a tertiary amine catalyst, and permit the reaction which results to proceed so that a light weight resilient, foamed product is formed.

All of the foamed products made as described in the above referred to patent application of Wilson and Shuffman, as well as any other polyester foamed material, can be utilized in the novel materials of the present invention.

Although resilient, foamed polyester resins, made, for example, as described in the Wilson and Shuffman application, have properties generally similar to these of foam rubber, it has been found that the new resin materials have many properties which are superior to the foam rubber product. Foam rubber, for example, cannot be successfully laminated to other materials with a sufficiently firm bond to stand the stresses of hard usage. It is inherently too easily torn so that bonds made with an adhesive soon fail. Also, if an attempt is made to heat seal a layer of foam rubber to another thermoplastic material, the foam rubber disintegrates. Thus, even though foam rubber has been found to be highly successful in cushioning and general upholstering, it has not been able to be successfully adapted to many other uses that are indicated for a material having the resiliency and softness possessed by foam rubber.

SUMMARY OF THE INVENTION

One object of the present invention is to provide novel laminated materials made from foamed polyester resins.

Another object of the invention is to provide novel upholstering materials.

Another object of the invention is to provide improved cushioning materials of laminated construction.

Another object of the invention is to provide novel laminated materials comprising one or more layers of an expanded, resilient material and one or more layers of a film-forming thermoplastic resinous material.

A further object is to provide methods of making improved laminated materials including resilient, expanded materials.

The invention will now be described in more detail with reference to the accompanying drawing wherein like parts are designated with the same numbers.

DETAILED DESCRIPTION

A feature of the invention is the provision of novel laminated materials having many new commercial uses, comprising one or more layers of foamed, expanded, low density polyester resin firmly united to one or more layers of other materials.

Figure 1:
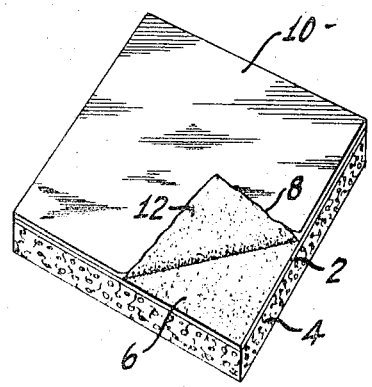
FIG. 1 is a perspective view of one form of laminated material of the present invention with a portion of one layer thereof turned back upon itself.

In accordance with the present invention it has been found that foamed polyester resins have properties which enable them to be joined to surfaces of many other materials such as sheets or films of thermoplastic resinous materials such as polyvinyl chloride, polyethylene, other polyester resins, natural and synthetic rubbers, cellulose acetate, cellulose nitrate, polystyrene, other polyvinyl resins and the like. It is also possible to laminate the foamed polyester resins to relatively rigid materials such as glass, wood and metals and also to fabrics of natural or synthetic fibers. A laminated article comprising a layer of a foamed polyester resin made as described in the aforementioned Wilson et al application and a sheet of polyvinyl chloride can be made as follows. Referring to FIG. 1, one surface 2 of a sheet 4 of the foamed resinous material is coated with a film 6 of a polyester resin in the nonexpanded state. For example, the resin may be one made by esterifying a dibasic acid such as succinic, adipic, or azelaic acid and a glycol such as di-, tri-, or polyethylene glycol and then reacted with a diisocyanate to give an adhesive of regulated curing properties and flexibility. The under surface 8 of the sheet 10 of a polyvinyl chloride is coated with a film 12 of the same polyester resin. The two coated surfaces are pressed together and permitted to cure at room temperature. The curing process takes from a few minutes to several hours depending upon the particular chemical composition of the adhesive. When completely cured, the two materials will be found to be firmly joined together. The laminated article can be flexed and crumpled without destroying the bond.

In a similar manner, sheets of the foamed material can be firmly bonded to thin films or sheets of many other flexible synthetic resinous materials such as polyethylene, polyester resins, polyurethanes, other vinyl plastics such as copolymers of vinyl chloride and vinyl acetate, polystyrene, and also to superpolyamides. Using the same bonding technique, the foamed material can also be bonded to woven cotton, woolen or synthetic fibre cloth and natural or synthetic rubber.

Laminated articles can also be made comprising a layer of the foamed polyester resin and a rigid material such as glass. A sheet of foamed polyester resin may be bonded to a sheet of glass by coating a surface of the sheet of foamed material and a surface of the glass with films of the polyester resin-diisocyanate mixture in liquid form as described in the previous example, placing the coated surfaces together and allowing to cure.

Figure 2:
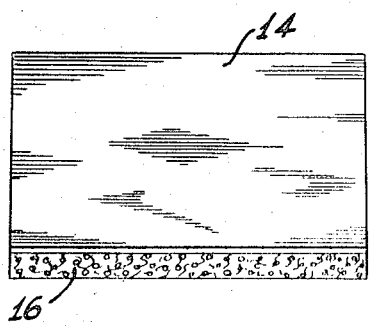
FIG. 2 is a perspective view of another embodiment of a material of the present invention.
Figure 3:
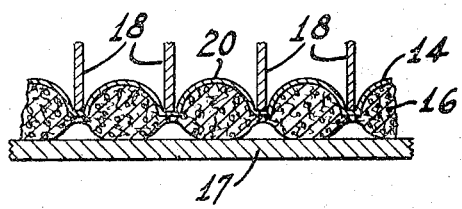
FIG. 3 is an elevation cross sectional view illustrating one step in the manufacture of one type of laminated article made in accordance with the present invention.
Figure 4:
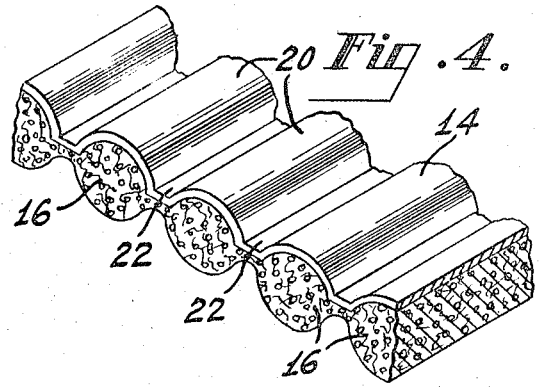
FIG. 4 is a partial perspective view of the article made in accordance with the process illustrated in FIG. 3.

A different type of laminated article comprising a layer of the foamed polyester resin and a layer of flexible thermoplastic resinous material can be made by the following process. Referring now to FIG. 2, a thin sheet 14 of a thermoplastic resinous material, such as polyethylene, is placed on top of a sheet 16 of the foamed polyester resin with no adhesive between the two layers. This assembly is placed on the lower platen 17 of a high frequency dielectric heat sealing machine. The upper platen of the machine comprising a plurality of metal bars or rods 18 arranged in any desired configuration such as shown in FIG. 3, is pressed down into the upper surface of the soft, yielding "sandwich" until only a short distance separates the upper and lower platens. The assembly of polyethylene sheet and foamed polyester resin layer is thus arranged in a series of convolutions 20. Current is applied to the machine for about 2 to 5 seconds using about 2 KW at 27 megacycles, and the upper platen is raised free. As shown in FIG. 4, the polyethylene sheet has become fused to the layer of foamed resin along the strips 22 which were contacted by the lower ends of the metal bars 18 of the upper platen and the article assumes the regular convoluted appearance shown. Drawing together of the folds of the layer of foamed material causes it to become convoluted on both surfaces. 5KW of power can be applied for briefer periods of time.

It will be apparent that convolutions of almost any desired surface pattern can be impressed into the material using the method described above. For example, the article can be given a quilted appearance.

Laminated material, made as described above, has many uses in the upholstery and cushioning field. The bond produced is extremely tough and, since no stitching is required, durability is greatly enhanced. Any of the thermoplastic filmforming resinous materials can be bonded to the foamed polyester resin in the manner described. For example, polyvinyl chloride sheet material bonds even better than polyethylene.

Figure 5:
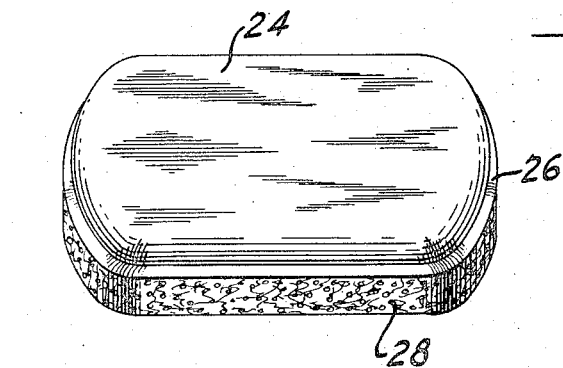
FIG. 5 is a perspective view of another type of laminated article made in accordance with the present invention.

Articles of many different forms and adapted to a variety of uses, can be made by heat-sealing a sheet of the foamed polyester resin to a sheet of unfoamed thermoplastic resinous material as described above. Referring now to FIG. 5, a sheet 24 of polyvinyl chloride can be heat-sealed around a peripheral edge strip 26 to a layer 28 of the polyester foam to form a cosmetic applicator.

Figure 6:
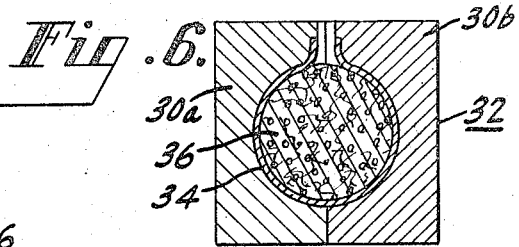
FIG. 6 is a cross section elevation view illustrating a step in a molding process in accordance with the present invention.

It is also possible to make laminated articles of intricate form out of the polyester foam, by a molding process. Referring to FIG. 6, two halves 30a and 30b of a steel mold 32 are provided with an interior coating layer 34 of uncured polyester resin. The halves of the mold are assembled and the mold is partially filled with a reaction mixture capable of forming the polyester foam as described in aforementioned application Ser. No. 420,744. As reaction proceeds in the mixture it expands to fill the mold with the foamed resin 36. The molded product is then allowed to cure for a period of time, this period usually being at least 1 hour. The mold halves are parted and the laminated article stripped therefrom. Other resinous materials, such as polyvinyl chloride, can be used instead of the polyester resin to coat the interior of the mold. In this case the resin coating is in the cured or polymerized state before introducing the polyester foam mix into the mold.

Figure 7:
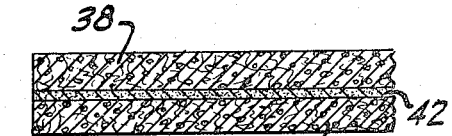
FIG. 7 is a cross sectional elevation view of still another type of laminated article of the present invention.

Two similar layers of foamed diisocyanate modified polyester resin of the character aforesaid can also be laminated together. As shown in FIG. 7, juxtaposed surfaces of two layers 38 and 40 of the foamed material can be firmly joined together by coating them with a thin layer 42 of diisocyanate modified polyester resin adhesive, pressing the coated layers together and curing the adhesive.

We claim:

1. A material comprising a layer of a resilient, foamed, diisocyanate-modified, polyester resin, portions of said layer being coalesced and thereby permanently reduced in thickness.

2. A material having a convoluted appearance, said material comprising a layer of a foamed, resilient, diisocyanate-modified, polyester resin, said layer having regularly spaced portions partially coalesced and of reduced thickness.

3. A material comprising a layer of resilient, foamed, polyester resin consisting of the reaction product of (1) a polyester resin derived from a polycarboxylic acid and a polyhydric alcohol, (2) a diisocyanate, (3) water, and (4) a tertiary amine catalyst, spaced portions of said layer being coalesced under heat and pressure and thereby being permanently reduced in thickness.

4. A body of resilient polyurethane foam having at least a portion thereof that is permanently compressed as the result of thermal coalescence while under compression.

5. A body of resilient polyurethane foam presenting a convoluted appearance imparted by thermally coalesced localized areas of predetermined location wherein said foam is permanently compressed in relation to adjoining areas.

6. A method which comprises compressing foam comprised in a body of resilient polyurethane foam and while said foam is compressed subjecting it to heat until the compressed foam becomes fused in a permanently compressed state, and permitting said foam to cool while in said permanently compressed state.

7. A method of imparting a convoluted surface to a body of resilient urethane foam which comprises compressing predetermined localized areas of the foam body and while the foam in said areas is under compression subjecting said areas to heat localized in said areas until the compressed foam in said areas becomes fused in the permanently compressed state and then permitting the compressed fused foam in said areas to cool while in said permanently compressed state.

8. A method of making a material comprising, providing a layer of a resilient, foamed, polyester resin consisting of the reaction product of (1) a polyester resin derived from a polycarboxylic acid and a polyhydric alcohol, (2) a diisocyanate, (3) water, and (4) a tertiary amine catalyst, then applying to said layer at predetermined spaced portions thereof localized pressure which compresses said foam to reduced thickness at said portions and localized heat sufficient to coalesce said layer in permanently compressed state at said portions and then permitting said coalesced permanently compressed portions to cool.

* * * * *